United States Patent
Smith

(10) Patent No.: US 12,382,246 B2
(45) Date of Patent: *Aug. 5, 2025

(54) SYSTEM AND METHOD OF DETERMINING REAL-TIME LOCATION

(71) Applicants: DENSO International America, Inc., Southfield, MI (US); DENSO CORPORATION, Kariya (JP)

(72) Inventor: Eric J. Smith, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,339

(22) Filed: May 1, 2024

(65) Prior Publication Data

US 2024/0292183 A1   Aug. 29, 2024

Related U.S. Application Data

(63) Continuation of application No. 17/709,682, filed on Mar. 31, 2022, now Pat. No. 11,991,589.

(60) Provisional application No. 63/168,425, filed on Mar. 31, 2021.

(51) Int. Cl.
| | |
|---|---|
| *H04W 4/02* | (2018.01) |
| *A44B 15/00* | (2006.01) |
| *B60R 25/24* | (2013.01) |
| *G07C 9/00* | (2020.01) |

(52) U.S. Cl.
CPC .......... *H04W 4/023* (2013.01); *A44B 15/005* (2013.01); *B60R 25/245* (2013.01); *G07C 9/00309* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 6,154,149 A | 11/2000 | Tyckowski et al. | |
| 9,134,727 B2 | 9/2015 | Monig et al. | |
| 9,466,165 B2* | 10/2016 | Bartolotta | G07C 9/00896 |
| 9,794,753 B1 | 10/2017 | Stitt et al. | |
| 10,055,919 B2* | 8/2018 | Asmar | B60R 25/04 |
| 10,616,710 B2 | 4/2020 | Stitt et al. | |
| 2009/0096576 A1 | 4/2009 | Oman et al. | |
| 2010/0117868 A1 | 5/2010 | Van Wiemeersch et al. | |
| 2010/0171642 A1 | 7/2010 | Hassan et al. | |
| 2011/0148573 A1 | 6/2011 | Ghabra et al. | |
| 2012/0256743 A1 | 10/2012 | Horton et al. | |
| 2012/0258726 A1 | 10/2012 | Bansal et al. | |
| 2017/0303080 A1 | 10/2017 | Stitt et al. | |
| 2017/0303090 A1 | 10/2017 | Stitt et al. | |
| 2017/0352211 A1* | 12/2017 | Asmar | B60R 25/241 |
| 2019/0024438 A1 | 1/2019 | Budd et al. | |
| 2020/0196094 A1 | 6/2020 | Smith | |

(Continued)

*Primary Examiner* — Carlos Garcia
(74) *Attorney, Agent, or Firm* — Warner Norcross + Judd LLP

(57) ABSTRACT

A system and method are provided for determining location information of a vehicle keyfob relative to an object. The system and method may include communicating with a primary device (e.g., a smartphone) having primary device authentication information with respect to the object, and receiving parameter information, such as keyfob authentication information, from the primary device.

20 Claims, 7 Drawing Sheets

(56) References Cited

U.S. PATENT DOCUMENTS

| | | |
|---|---|---|
| 2020/0196095 A1 | 6/2020 | Smith et al. |
| 2020/0196103 A1 | 6/2020 | Smith et al. |
| 2020/0307555 A1 | 10/2020 | Van Wiemeersch et al. |
| 2021/0392461 A1 | 12/2021 | Cooper et al. |
| 2022/0322029 A1 | 10/2022 | Smith |

* cited by examiner

SYSTEM AND METHOD OF DETERMINING REAL-TIME LOCATION

FIELD OF THE INVENTION

The present application relates to a system and method for determining location information with respect to a keyfob and an object, such as a vehicle.

BACKGROUND

Real-time location or position determinations for objects have become increasingly prevalent across a wide spectrum of applications. Real-time locating systems (RTLS) are used and relied on for tracking objects, such as smartphones, in many realms including, for example, automotive, storage, retail, security access for authentication, and security access for authorization.

One conventional RTLS in the automotive realm includes a transceiver or master controller located within a vehicle and capable of communicating via radio frequency (RF) with a smartphone. One or more aspects of the communications between the master controller and the smartphone, such as signal strength of the communications, may be monitored and used as a basis for determining a location of the smartphone relative to the vehicle. For instance, if the signal strength of communications is low, the smartphone may be farther away from the vehicle relative to communications where the signal strength is high. In general, the strength of communications drops off as the distance increases between the smartphone and the vehicle. Based on this or other measurements of a signal characteristic of communications, a location of the smartphone may be determined.

Use of a smartphone in determining a location offers several advantages. Smartphones in many conventional respects have become a user's central point of access for information and interacting with other systems. The smartphone has become nearly ubiquitous in the developed world and is often a user's primary point of access to the Internet. Using existing technology available on the smartphone in conjunction with a location system for controlling point of entry or use of functionality associated with an object allows a user to rely on their existing smartphone configuration. This can significantly reduce the number of barriers to use relative to conventional systems.

There are cases, however, in which a user is not carrying a smartphone. For instance, not every person owns a smartphone. And not every person carries their smartphone at all times. Some users express a preference to avoid carrying their smartphone all the time. A barrier to use is presented in this circumstance, particularly if an object, such as a vehicle, has been adapted to operate with a smartphone.

SUMMARY

A system and method are provided for determining location information of a vehicle keyfob relative to an object. The system and method may include communicating with a primary device (e.g., a smartphone) having primary device authentication information with respect to the object, and receiving parameter information, such as keyfob authentication information, from the primary device.

In one embodiment, a vehicle keyfob operable to communicate with an object is provided. The vehicle keyfob may include an antenna system configured to communicate wirelessly with the object, where the vehicle keyfob and the object are configurable to communicate wirelessly via a primary communication link. The vehicle keyfob may include a controller operably coupled to the antenna system, and configured to receive one or more parameters from a remote device via a secondary communication link with the remote device.

The controller may be configured to direct the antenna system to transmit communications to the object via the primary communications link, whereby the object is operable to determine a location of vehicle keyfob based on the communications from the vehicle keyfob.

In one embodiment, a display is absent from the vehicle keyfob.

In one embodiment, the one or more parameters pertain to at least one of authorization with respect to one or more capabilities of the object and authentication with respect to the keyfob relative to the object.

In one embodiment, the controller is configured to communicate wirelessly with a plurality of devices disposed on the object. As an example, the plurality of devices may include an object device and at least one sensor disposed on the object, where the controller is configured to establish the primary communication link with at least one of the plurality of devices.

In one embodiment, a remote device is configured to facilitate operation of an object. The remote device includes an antenna system configured to communicate wirelessly with the object via a primary communication link, where the antenna system is configured to communicate wirelessly with a vehicle keyfob separate from the remote device. The remote device may include a memory to store one or more parameters pertaining to the object, and a controller operably coupled to the antenna system. The controller may be configured to transmit one or more parameters to the vehicle keyfob, where a location of the vehicle keyfob is determined with respect to the object, and where at least one of an object status and an object event is authorized based on the one or more parameters provided to the vehicle keyfob.

In one embodiment, the vehicle keyfob is operable to communicate wirelessly with the object based on the one or more parameters.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

A system and method for determining location information of a vehicle keyfob relative to an object is provided. The system and method may include communicating with a primary device (e.g., a smartphone) having primary device authentication information with respect to the object, and receiving parameter information, such as keyfob authentication information, from the primary device. The system and method may include a keyfob being operable to communicate with the object in accordance with the received parameter information, where a location of the keyfob is determined based on communications with the object.

In one embodiment, the keyfob may be operable, based on the received parameter information, to authenticate and to obtain authorization with respect to a function of the object, such as disengagement of a lock associated with the object.

In one embodiment, the object includes a plurality of sensors or remote devices operable to obtain sensor information with respect to communications between an object device and the keyfob. The sensors may communicate the sensor information to a locator operable to determine a location of the keyfob relative to the object based on the sensor information.

In one embodiment, the system may be operable such that a phone (e.g., a portable device) can be used in conjunction with one or more of the following: 1) communicating with a fob for fob-related functions (e.g., update, configure, reconfigure, remap buttons, require presence with a phone for additional security, locate the fob), 2) in the prior list, but to call out specifically, configure the fob to access a different object (or an object for the first time, if the fob was not previously configured to do so). The phone may not be required to be connected to the fob to access the object. For instance, it is not expected that the fob would always be connected to the phone when the fob is near the phone. The system may provide a procedure for the fob and phone to connect to each other, such as pushing a button on the fob or using NFC or using a mobile app.

I. System Overview

Figure 1:
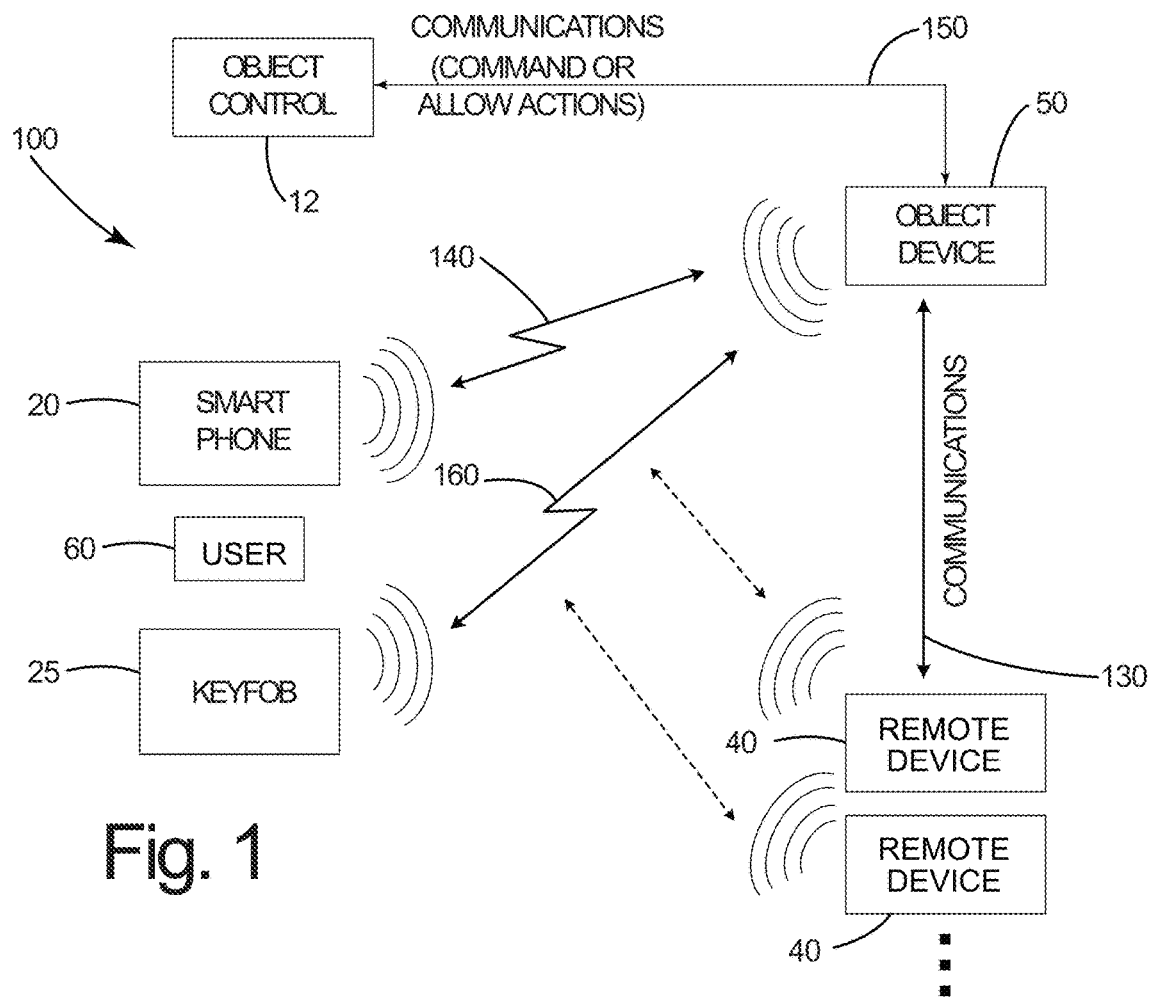
FIG. 1 shows a representative view of a system in accordance with one embodiment.
Figure 2:
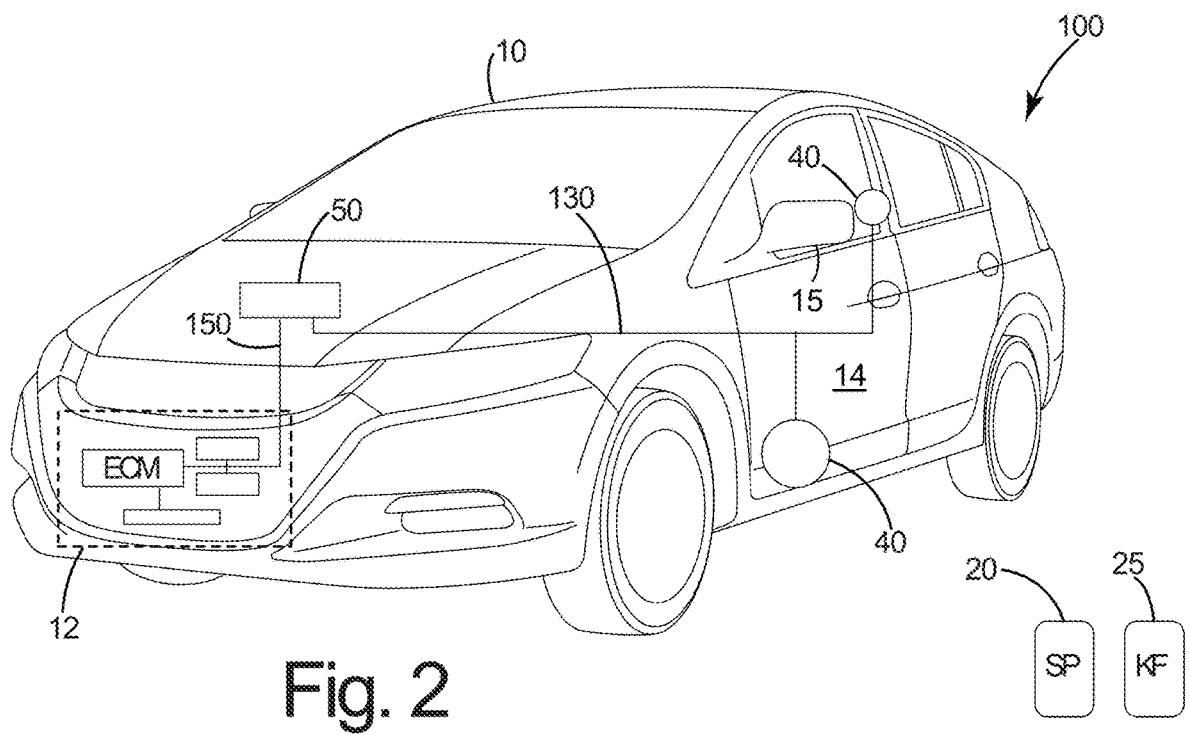
FIG. 2 shows a representative view of the system of FIG. 1 in accordance with one embodiment.

A system in accordance with one embodiment is shown in the illustrated embodiment of FIGS. 1 and 2 and generally designated 100. The system 100 may include one or more system components as outlined herein. A system component may be a user 60, an object device 50, or remote device 40 (e.g., a sensor) shown in the illustrated embodiment of FIG. 1. The system component also may be a smartphone 20, keyfob 25, or another electronic component including one or more aspects of the example devices. The underlying components of the system component, as discussed herein, may be configured to operate in conjunction with any one or more system components. In this sense, in one embodiment, there may be several aspects or features common among the smartphone 20, the keyfob 25, the remote device 40, and the object device 50, as well as other components of the system 100 described herein.

For instance, one or more features described in connection with the object device 50 depicted in FIG. 3 may form part of a smartphone 20, the keyfob 25, or the remote device 40, or any combination thereof. Conversely, one or more features described in conjunction with the smartphone 20, the keyfob 25, or the remote device 40 may form part of the object device 50. Additionally, or alternatively, it is to be understood that any feature described in conjunction with any of the object device 50, the smartphone 20, keyfob 25, remote device 40, and any system component, may be absent in one or more embodiments. In one embodiment, the object device 50 or a component of a control system of an object 10 may include the same or similar components described in conjunction with a system component, and may form a component disposed on the object 10, such as a vehicle or a building.

An object device 50 in the form of a system component may be communicatively coupled to one or more systems of the object 10, collectively forming an object control system to control operation of the object 10. Information may be communicated among system components of the object control system, including information transmitted and received between two or more components of the object 10.

As mentioned herein, the object 10 including the object device 50 may include communication capabilities. The object 10 may include one or more communication networks 150, wired or wireless, that facilitate such communication, such as a wired bus shown in the illustrated embodiment of FIG. 1. The communication network 150 may also enable one or more system components, internal or external to the object control system, to communicate with the object control system. For instance, the communication network 150 may facilitate communication between the object control system (including one more system components as described herein) and the object device 50. Such a communication network 150 may be a CAN bus and is shown as a vehicle bus in the illustrated embodiment of FIG. 2. Additionally, or alternatively, the object control system may facilitate communication directly or indirectly among system components. For instance, the object control system in the illustrated embodiment of FIG. 1 is configured to communicate and enable direct communication between the object device 50 and an object control 12, embodied to include an engine control module (ECM).

In one embodiment, the object 10 may include a telematics control unit (TCU), which is not shown. For instance, the TCU may be connected to the object control system via the communication network 150 or another type of communication link, such as an SPI link. In another embodiment, the TCU may be combined with the object control system, such as being part of the object control 12. The TCU may be absent in one embodiment and data that would have been provided by the TCU may be tunneled through the smartphone 20 (e.g., via BTLE). "Tunneled" may be defined as a traditional tunnel—like running TCP/IP over BTLE; however, the present disclosure is not so limited. The tunnel may be defined as a configuration that enables relevant data to be communicated to the object control system or other system components via commands/responses.

In one embodiment, the TCU may include a cellular modem or other long range WAN radio (Lora, Sigfox, etc.).

In one embodiment, as described above, the TCU is not a required part of the system; for instance, all functionality of the TCU and the system it communicates with may be performed locally (e.g., not in the cloud).

In the illustrated embodiment of FIGS. 1 and 2, the object 10 is provided with an object device 50 and a plurality of remote devices 40 disposed at positions relative to the object 10. For instance, in the context of the vehicle shown in FIG. 2, the remote devices 40 are disposed inside or near the vehicle door 14, inside or near the vehicle rearview mirror 15, or a variety of other locations of the vehicle. Example locations are also described in U.S. Pat. No. 10,356,550 to Smith et al., entitled METHOD AND SYSTEM FOR ESTABLISHING MICROLOCATION ZONES, filed Dec. 14, 2017, issued Jul. 16, 2019, and U.S. Pat. No. 10,362,461 to Stitt et al., entitled SYSTEM AND METHOD FOR MICROLOCATION SENSOR COMMUNICATION, filed Dec. 22, 2017, issued Jul. 23, 2019—the disclosures of which are hereby incorporated by reference in their entirety.

The remote devices 40 in one embodiment may be sensors or monitor devices capable of detecting communications with respect to the smartphone 20, the keyfob 25, and another system component, such as the object device 50 or another remote device 40. In one embodiment, the remote devices 40 may communicate sensed information (e.g., signal strength, time of flight, angle of arrival) pertaining to communications detected with respect to the smartphone 20 and the keyfob 25. For instance, the remote device 40 may communicate sensed information via a communication link 130 to another device, such as the object device 50, connected to the communication link 130. The object device 50 may be operable to determine a location of the smartphone 20 or keyfob 25, or both, based on the sensed information. Examples of such a determination are also described in U.S. Pat. No. 10,356,550 to Smith et al., entitled METHOD AND SYSTEM FOR ESTABLISHING MICROLOCATION ZONES, filed Dec. 14, 2017, issued Jul. 16, 2019, and U.S. Pat. No. 10,362,461 to Stitt et al., entitled SYSTEM AND METHOD FOR MICROLOCATION SENSOR COMMUNICATION, filed Dec. 22, 2017, issued Jul. 23, 2019—the disclosures of which are hereby incorporated by reference in their entirety.

Based on the determined location of the smartphone 20 relative to the object 10, the object device 50 may transmit a command or instruction to the object control 12 to enable a capability of the object 10, such as to mobilize the object 10 in the case of vehicle, or to enable access to a location related to the object 10. The object device 50 in one embodiment may include a locator capable of receiving sensor information pertaining to wireless communications with the smartphone 20 (e.g., Bluetooth Low Energy (BTLE), Ultra Wide Band communications, or BLE channel sounding (high accuracy distance measurements) (CS/HADM), or a combination thereof), including one or more signal characteristics of the communications, such as signal strength (e.g., RSSI), Angle of Arrival (AOA), and Time of Flight (TOF).

In one embodiment, the object device 50 may include a secure element controller capable of facilitating communications with a secure element the object device 50. Such communications may be conducted by one or more of the remote devices 40 in a distributed or shared manner as described herein, such that secure element information is transmitted from the object device 50 to the remote device 40 via the communication link 130. The communication link 130 may be a wired connection or wireless connection, or a combination thereof. As an example, the communication link 130 may be established via a BTLE connection, or the communication link 130 may be established via a CAN bus.

Figure 3:
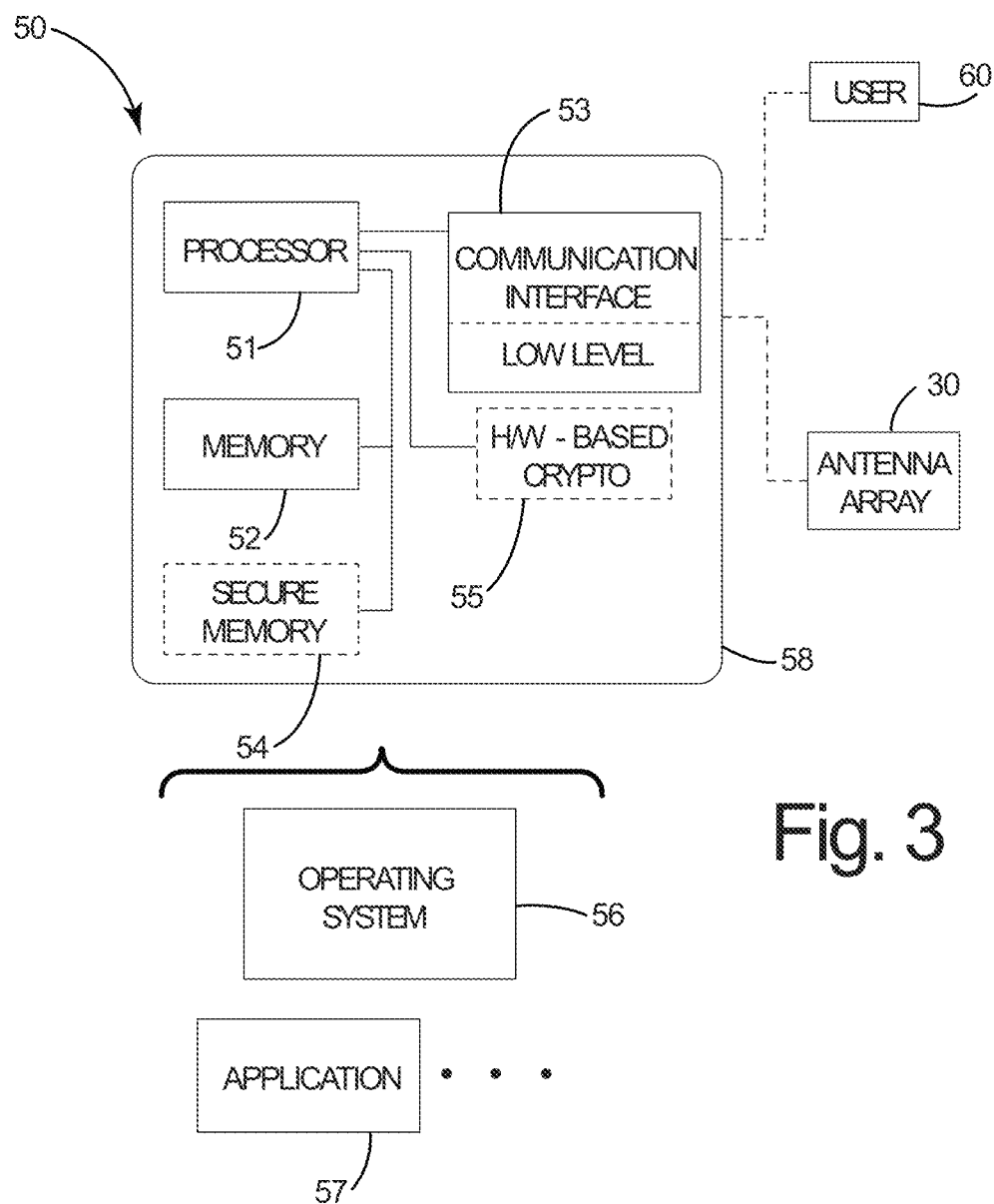
FIG. 3 shows a representative view of aspects of an object device in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the smartphone 20, the keyfob 25, or the remote device 40, or any combination thereof, may similarly include a controller 58 configured to control operation or aspects of the respective system component.

The controller 58 may include electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including Bluetooth Low Energy (BTLE) communications.

As another example, the communication interface 53 may provide a wireless communication link with another system component in the form of the smartphone 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the smartphone 20 or the keyfob 25, or both. In the illustrated embodiment of FIGS. 1 and 2, the user 60 may carry the smartphone 20 or the keyfob 25. The system 100 may facilitate locating the smartphone 20 or the keyfob 25 with respect to the object 10 (e.g., a vehicle) in real-time with sufficient precision to determine whether the user 60 is located at a position at which access to the object 10 or permission for an object command should be granted.

For instance, in an embodiment where the object 10 is a vehicle, the system 100 may facilitate determining whether the smartphone 20 or the keyfob 25 is outside the vehicle but in close proximity, such as within 5 feet, 3 feet, or 2 feet or less, to the driver-side door 14. This determination may form the basis for identifying whether the system 100 should unlock the vehicle. On the other hand, if the system 100 determines the smartphone 20 or the keyfob 25 is outside the vehicle and not in close proximity to the driver-side door (e.g., outside the range of 2 feet, 3 feet, or 5 feet), the system 100 may determine to lock the driver-side door. As another example, if the system 100 determines the smartphone 20 or the keyfob 25 is in close proximity to the driver-side seat but not in proximity to the passenger seat or the rear seat, the system 100 may determine to enable mobilization of the vehicle. Conversely, if the smartphone 20 or the keyfob 25 is determined to be outside close proximity to the driver-side seat, the system 100 may determine to immobilize or maintain immobilization of the vehicle. It is to be understood that the object 10 may be any type of object and is not limited to a vehicle. For instance, the object 10 may be a point-of-sale terminal, a door, a turnstile, another type of vehicle, such as a train, bus, airplane, or ship. Additionally, or alternatively, the object 10 may correspond to an individual location or seat within another object.

The object 10 may include multiple object devices 50 or variant thereof, such as an object device 50 including a remote device 40 coupled to an antenna array 30, in accordance with one or more embodiments described herein.

Micro-location of the smartphone 20 or the keyfob 25 may be determined in a variety of ways, such as using information obtained from a global positioning system, one or more signal characteristics of communications from the smartphone 20 or the keyfob 25, and one or more sensors (e.g., a proximity sensor, a limit switch, or a visual sensor), or a combination thereof. An example of micro-location techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIGS. 1-3, the object device 50 (e.g., a system control module (SCM)) and a plurality of remote devices 40 (coupled to an antenna array 30 as shown in FIG. 3) may be disposed on or in a fixed position relative to the object 10. Example use cases of the object 10 include the vehicle identified in the prior example, or a building for which access is controlled by the object device 50.

The smartphone 20 may communicate wirelessly with the object device 50 via a communication link 140. The keyfob 25 may communicate wirelessly with the object device 50 via a communication link 160. The communication link 160 may be similar to the communication link 140, as described herein.

The plurality of remote devices 40 may be configured to sniff the communications of the communication link 140 between the smartphone 20 and the object device 50 to determine one or more signal characteristics of the communications, such as signal strength, time of arrival, time of flight, or angle of arrival, or a combination thereof. In one embodiment, the plurality of remote devices 40 may be configured to sniff the communications of the communication link 160 between the keyfob 25 and the object device 50 to determine one or more signal characteristics of the communications. At least one of the smartphone 20, the keyfob 25, and the object device 50 may be operable to determine one or more signal characteristics of the communications via one or both of the communication link 140 and the communication link 160.

In an alternative embodiment, the smartphone 20 or the keyfob 25 may establish communications with another device other than the object device 50. At least one of the object device 50 and the one or more remote devices 40 may be configured to sniff these communications to determine a location of the respective device relative to the object 10.

The determined signal characteristics may be communicated or analyzed and then communicated to the object device 50 via a communication link 130 separate from the communication link between the smartphone 20 or keyfob 25 and the object device 50. Additionally, or alternatively, the smartphone 20 and/or the keyfob 25 may establish a direct communication link with one or more of the remote devices 40, and the one or more signal characteristics may be determined based on this direct communication link.

Figure 8:
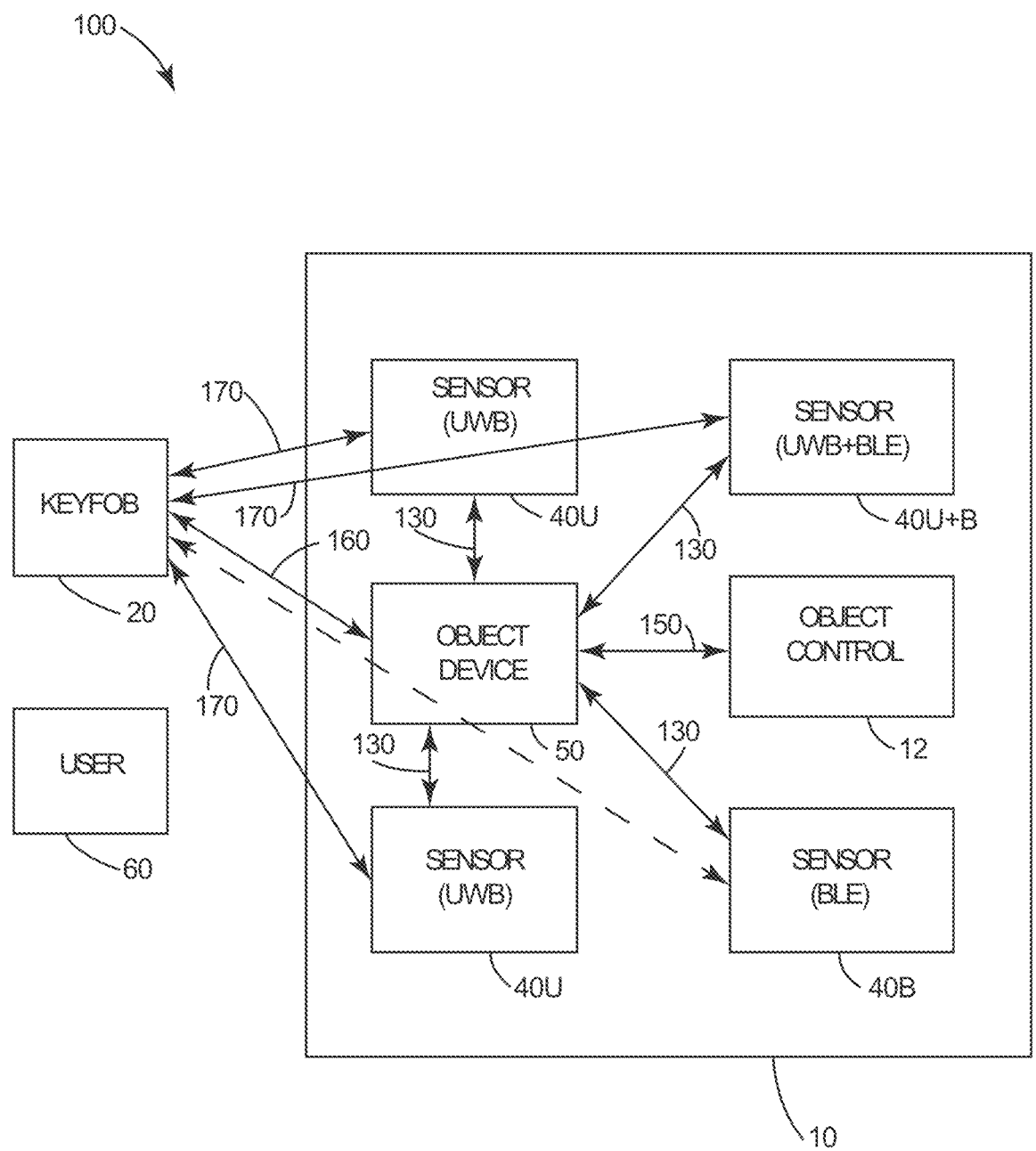
FIG. 8 shows a representative view of a system in accordance with one embodiment.

For instance, an alternative configuration of the system 100 is shown in the illustrated embodiment of FIG. 8. The system 100 may include a keyfob 25, a user 60, and an object 10, similar to the system described in conjunction with FIG. 1. The object 10 in accordance with one embodiment may include an object device 50, an object control 12, and a plurality of sensors, which may be similar to the remote devices 40 described herein.

In the illustrated embodiment, the keyfob 25 may include both Ultra Wide Band (UWB) and BTLE communication capabilities.

The system 100 in the illustrated embodiment of FIG. 8 may include one or more remote devices 40 (which may also be described as anchors) that are disposed on the object 10. The one or more remote devices 40 may be disposed in a variety of positions on the object 10, such as the positions described herein, including for instance, one or more remote devices 40 in the door panel and one or more other sensors in the B pillar, as shown and described in connection with FIG. 2.

One or more of the remote devices 40 may be operable to communicate via at least one communication link according to a communication protocol. The communication link may be established via one or more channels. As described in connection with FIG. 2, the remote device 40 may be operable to communicate by sniffing or receiving communications via at least one communication link 160 established between the object device 50 and the keyfob 25, such that the remote device 40 does not transmit communications via the communication link 160. This type of communication for the remote device 40 is shown in phantom lines in FIG. 8.

In one embodiment, one or more remote devices 40 in the system 100 of FIG. 8 may be operable to communicate by transmitting and receiving communications via at least one communication link 170 established directly with the keyfob 25. In this way, the remote device 40 may directly communicate with the keyfob 25. The at least one communication link 170 may include communications according to more than one protocol (e.g., BTLE and UWB).

The one or more remote devices 40 of the system 100 in the illustrated embodiment of FIG. 8 may be operable to a) sniff communications with respect to the communication link 160 between the keyfob 25 and the object device 50, or b) directly communicate with the keyfob 25 via the at least one communication link 170. The communication capabilities of the one or more remote devices 40 in the illustrated embodiment are identified in FIG. 8 and by a letter designation U for UWB and B or BTLE. For example, the remote device 40U is an ultra-wideband anchor responsive to UWB signals; remote device 40U+B is responsive to both UWB and BTLE communications; and remote device 40B is a BTLE anchor.

It is to be understood that an object 10, such as a vehicle, may include more remote devices 40 (e.g., anchors) than shown in the illustrated embodiment of FIG. 8. Depending on the implementation, some number of anchors may be integrated in a vehicle. For instance, 3 to 10 anchors with both UWB and BTLE capabilities may be provided.

In one embodiment, UWB, similar to BTLE, is a standardized communication protocol (see IEEE 802.15.4a/z). One way in which UWB may differ from BTLE is with respect to ranging applications. UWB may involve transmitting short duration pulses that allow for time-of-flight functions to be used to determine the range from the smartphone 20 to one or more remote devices 40U, 40U+B (e.g., anchors). Then the object device 50 may use a lateration function and/or a multilateration function to determine localization with respect to the keyfob 25 (e.g., the location of the keyfob 25 relative to the object 10). Lateration and/or multilateration may involve processing a set of ranges from the keyfob 25 to each remote device 40 to output a position estimate of the keyfob 25 relative to the object 10. The keyfob 25 and the UWB-enabled remote devices 40U, 40UB may transmit and receive packets of data back-and-forth, enabling a time-of-flight determination with respect to such communications.

The system 100 in the illustrated embodiment of FIG. 8 may include at least two different communication links for determining localization. For instance, the communication link 140 may utilize BTLE-based localization, and the communication link 170 may utilize UWB-based localization. In the illustrated embodiment, the communication link 170 is designated with respect to each of the remote devices 40U, 40U+B; however, it is to be understood that each of these communication links 170 may not be the same. For instance, each of the communication links 170 may be separate (e.g., a separate channel or band).

Utilizing multiple communication links for localization may provide a number of benefits.

For instance, in a configuration in which both BTLE and UWB information are obtained, this information can be combined to enhance and stabilize a localization estimate. The BTLE and UWB channels used in the localization may involve different frequencies, and the signal characteristics to be exploited for ranging are different (RSSI for BTLE and time-of-flight for UWB).

RSSI ranging calibration may be augmented or supplemented with time-of-flight from UWB communications. This augmentation or supplemental use of time-of-flight may be conducted in real-time by the system 100, or conducted in a manner to adapt a model that uses sensed information not based on UWB communications (e.g., only sensed information with respect to BTLE communications).

For instance, one embodiment according to the present disclosure may be directed toward calibrating out variance of RSSI or range calculations. BTLE+UWB capable keyfob 25 may be tested to build up a map of BTLE communication characteristics, UWB communication characteristics, and ranging or localization data. A BTLE-only keyfob 25 may be operable to process such maps but without UWB communications characteristics to refine RSSI-only range estimates. For instance, the locator 210 may be based on both BTLE+UWB communication characteristics; however, in practice, the locator 210 may generate location information based on BTLE communication characteristics without the UWB communication characteristics. Alternatively, the locator 210 may be based on BTLE communication characteristics, and may be operable in practice to generate location information based on both UWB and BTLE communication characteristics. It is to be understood that BTLE or UWB, or both, may be replaced with another type of communication protocol.

The keyfob 25, in one embodiment, can establish a direct communication link 170 with one or more of the remote devices 40U, 40U+B, and the one or more signal characteristics (e.g., time-of-flight) may be determined based on this direct communication link 170.

In one embodiment, the smartphone 20 described herein may communicate with the object 10 in a manner similar to the keyfob 25. The smartphone 20 may directly establish direct communications with one or more of the object device 50 and remote devices 40U, 40B, 40U+B. Such direct communication may occur alternative to or in addition to direct communications between the keyfob 25 and one or more of the object device 50 and remote devices 40U, 40B, 40U+B. For instance, a direct communication link 170 depicted in FIG. 8 may be formed between the remote device 40U and the smartphone 20. The smartphone 20 is not shown in FIG. 8 for purposes of clarity, but is should be understood that the communication links shown in conjunction with keyfob 25 in FIG. 8 may be provided additionally in conjunction with the smartphone 20. It is also to be understood that the communication links with the smartphone 20 and keyfob 25 may be shared or different from each other. For instance, a first direct communication link 170 may be provided between the remote device 40U and the smartphone 20, and a second direct communication link 170 may be provided between the same remote device 40U and the keyfob 25. The first and second direct communication links 170 may be the same or may be different (e.g., using different channels or bands).

As described herein, one or more signal characteristics, such as signal strength, time of arrival, time of flight, and angle of arrival, may be analyzed to determine location information about the smartphone 20 or the keyfob 25, or both, relative to the object 10, an aspect of the object 10, or the object device 50, or a combination thereof. For instance, time difference of arrival or the angle of arrival, or both, among the remote devices 40 and the object device 50 may be processed to determine a relative position of the smartphone 20 or the keyfob 25, or both. The positions of the one or more antenna arrays 30 relative to the object device 50 may be known so that the relative position of the keyfob 25 can be translated to an absolute position with respect to the antenna arrays 30 and the object device 50.

Additional or alternative examples of signal characteristics may be obtained to facilitate determining position according to one or more algorithms, including a distance function, a trilateration function, a triangulation function, a lateration function, a multilateration function, a fingerprinting function, a differential function, a time of flight function, a time of arrival function, a time difference of arrival function, an angle of departure function, a geometric function, etc., or any combination thereof.

The smartphone 20 in the illustrated embodiment may be capable of communicating via a communication link 140 with one or more of the remote devices 40 and the object device 50 according to a communication standard. The communication link 140 in the illustrated embodiment is an BTLE communication link, but the present disclosure is not so limited.

The communication link 140 in one embodiment is not limited to a single type of communication link or establishment of a single communication link at a given time between the smartphone 20 and a system component of the object 10. For instance, the smartphone 20 may establish a first communication link 140 with a first remote device 40 according to the BTLE standard, and may simultaneously establish a second communication link 140 with the object device 50 according to the same or another standard (e.g., BTLE, NFC, or UWB). As another example, the smartphone 20 may establish a first communication link 140 with a first remote device 40 at one time according to the UWB standard, and establish a second communication link 140 with a second remote device 40 at another time according to the UWB standard or according to the BTLE standard.

In the illustrated embodiment, the communication link 140 is shown between the smartphone 20 and each of the object device 50 and the plurality of remote devices 40. It is noted that, as discussed herein, one or more of these communication links 140 may be established at any given time, and that multiple communication links 140 may be established simultaneously or at different times (with the same device or separate devices).

The keyfob 25 in the illustrated embodiment may be capable of communicating via a communication link 160 with one or more of the remote devices 40 and the object device 50 according to a communication standard. The communication link 160 in the illustrated embodiment is a BTLE communication link, but the present disclosure is not so limited. The communication link 160 may be established in accordance with any communication standard, including, for instance, communication standards described herein such as NFC and BTLE. It is to be understood that the communication link 160 may vary over time, such that at one time, the communication link 160 may be established in accordance with one standard, and at another time, the communication link 160 may be established in accordance with another standard. Additionally, or alternatively, a third communication link (not shown) may be established according to a communication protocol substantially simultaneously or at a different time relative to the second communication link 160. The communication protocol of the third communication link may be the same type as or different from the communication standard of the second communication link 160.

It is to be understood that the communication standards described herein and used in conjunction with the communication links may be in compliance with a documented communication standard, involve a modified form of the documented communication standard, or involve a proprietary communication standard, or any combination thereof.

The communication link 140 may include one or more types of communications (including various communication protocols) based on communication capabilities of the portable device 20 or keyfob 25, or both. For instance, the communication link 140 may be established in accordance with UWB communications and BTLE communications, simultaneously or at different times. Additionally, or alternatively, BTLE and BTLE CS/HADM may be provided in one or more devices of the system 100 (e.g., a portable device 20, a keyfob 25, or a remote device 40) on the same or different transceiver(s), using the same or different antenna(s).

In one embodiment, a remote device 40 may communicate directly with the portable device 20 or the keyfob 25, while optionally maintaining a connection to a control module of the object device 50). Communications with the portable device 20 and the object device 50 may be within the same connection (e.g., BTLE), but at different times and/or frequencies per that communications and/or ranging protocol.

II. Keyfob

As described in conjunction with the system 100, the keyfob 25 may be a system component with one or more aspects or features described in conjunction with the smartphone 20. For instance, the keyfob 25 may include a controller 58, a communication interface 53 and an antenna array 30. However, the keyfob 25 in the illustrated embodiment does not include a display or touchscreen. On the other hand, unlike the smartphone 20, the keyfob 25 may include one or more buttons dedicated to a particular function or set of functions, such as to unlock a door or lock a door. For instance, the keyfob 25 may include an unlock button and may be operable to communicate a command to unlock a vehicle door or doors, such as the driver-side door 14, based on a single press of the unlock button. Optionally, the keyfob 25 may be operable to transmit information indicative of an identity of the button pressed by a user, and the object 10 may determine an action based on this information. As an example, the object 10 may determine that the button pressed by the user is associated with a command to unlock a driver-side door, and may proceed accordingly.

The keyfob 25 in the illustrated embodiment, in contrast to a conventional keyfob, may be operable to communicate with the object 10 in accordance with one or more communication standards used by the smartphone 20 in communicating with the object 10 but without a display or touchscreen and with one or more dedicated buttons. The keyfob 25, as described herein, may be operable to communicate with the object 10, and the system 100 may be configured to determine a location of the keyfob 25 based on such communications. Alternatively, the keyfob 25 may not include buttons or a display.

In one embodiment, the keyfob 25 may be operable to receive parameter information from the smartphone 20. The parameter information in the illustrated embodiment may include authentication and/or authorization information that allows the keyfob 25 to authenticate with the object 10 and obtain authorization with respect to one or more functions of the object 10. For instance, based on the parameter information, the keyfob 25 may authenticate itself to the object 10 and demonstrate authorization to unlock a door or obtain access to a restricted area associated with the object 10. Additional or alternative functions include locking a door, mobilizing a vehicle, and starting a vehicle engine.

In one embodiment, the smartphone 20 and the keyfob 25 may include different or the same communication capabilities. For instance, the smartphone 20 may include or use both UWB and BTLE communication capabilities (e.g., a UWB radio and a BTLE radio), and the keyfob 25 may include or use one of UWB and BTLE communication capabilities. Alternatively, the smartphone 20 may include or use one of UWB and BTLE communication capabilities, and the keyfob 25 may include or use both UWB and BTLE communication capabilities. It should be understood that one or both of UWB and BTLE may be replaced or supplemented with a different communication protocol or methodology. For instance, an NFC communication protocol may be implemented by one or both of the smartphone 20 and the keyfob 25.

In one embodiment, the system 100 may define one or more zones with respect to the object 10, and determine a location of the smartphone 20 and/or the keyfob 25 with respect to one or more zones. The one or more zones may be predefined or dynamically defined. Based on a determination of a location of the smartphone 20 and/or the keyfob 25 with respect to one or more zones, the system 100 may determine to enable one or more functions or object commands. For instance, if the smartphone 20 and/or the keyfob 25 is determined to be outside the object and within 3 feet of the driver-side door 14, the object device 50 may direct the object 10 to enable or execute an unlocking and/or mobilization function. The command may be enabled passively or actively, such as by the user 60 pushing a button on the keyfob 25.

In one embodiment, the keyfob 25 may receive communication parameters pertaining to communications with the object device 50. The communication parameters may be received from the smartphone 20, and may correspond to communications via a protocol or communication link that is the same or different from a communication link or protocol between the smartphone 20 and the object device 50. For instance, the communication parameters may pertain to BTLE, which may also be used by the smartphone 20 to communicate with the object device 50. As another example, the keyfob 25 may receive communication parameters for ultra-wide band communications with the object device 50, while the smartphone 20 is capable of communicating primarily via BTLE with the object device 50.

In the illustrated embodiment, the keyfob 25 may be operable to communicate with the object 10 absent presence of the smartphone 20, and the object 10 may be operable to determine a location of the keyfob 25 and authorization of the keyfob 25 with respect to one or more object commands absent presence of the smartphone 20.

The fob may include NFC capabilities, which is wireless, in addition to longer range wireless communication capabilities, such as BLE and UWB. The phone may configure the fob to communicate with the vehicle via one or more wireless technologies with one or more authentication and authorization schemes.

III. Locator

Figure 4:
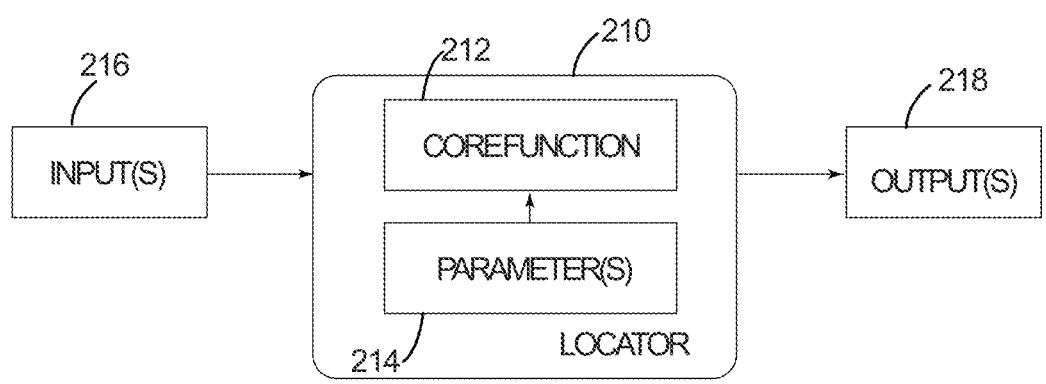
FIG. 4 shows a representative view of a locator in accordance with one embodiment.

The system 100 in the illustrated embodiment of FIGS. 1-8 may be configured to determine location information about the smartphone 20 relative to the object 10, or the keyfob 25 relative to the object 10. The location information may be indicative of an exterior location of the smartphone 20 or the keyfob 25, or both, relative to the object 10, or the location information may be indicative of an interior location of the smartphone 20 or the keyfob 25 within the object 10, or a combination thereof. In one embodiment, a locator may be configured to determine this location information. A locator in accordance with one embodiment is depicted in FIG. 4 and generally designated 210. The locator 210 may be configured to receive one or more inputs 216, such as one or more signal characteristics of wireless communications transmitted by the smartphone 20 and/or the keyfob 25 and received by one or more remote devices 40. The inputs may be translated to one or more outputs 218 corresponding to the location information.

The location information may take variety of forms. Examples types of location information include distance (such as a polar coordinate [distance+angle], a cartesian coordinate [x,y or x,y,z] distance), a computed signal strength, a relative distance (far, near, etc.), environmental indicator (e.g., reflectivity), a zone, and a quality metric, and one or more of these items with confidence levels, or any combination thereof.

An input 216, in one embodiment, may be based on outputs from multiple antennas (on the same or different devices in the system). For instance, the input 216 may be a function of the outputs from multiple antennas.

In one embodiment, multiple inputs 216 may be provided to the locator 210. The multiple inputs may each be based on one or more outputs from multiple antennas. Some or all of the multiple inputs 216 may be aligned in time. Some or all of the multiple inputs 216 may correspond to different points in time. In one embodiment, inputs 216 that are aligned in time may be based on communication sniffed by one or more remote devices 40. Additionally, or alternatively, at least one input 216 of inputs 216 that are not aligned in time may be based on aspects that are not sniffed.

It should be understood that the inputs 216 are not limited to signal characteristics of wireless communications. The inputs 216 may include one or more measurements of characteristics or parameters other than wireless communications, such as an object state (e.g., a door is open) or a previous location or zone determination, or any combination thereof. Additionally, or alternatively, the inputs 216 may be indicative of a state of the object 10 or another device in the system 100. For instance, in the context of a vehicle, one or more of the inputs 216 may indicate that one or more of the vehicle doors are open or closed, or whether a window is open or closed.

The locator 210 in the illustrated embodiment may be incorporated into the object device 50. For instance, the controller 58 of the object device 50 may incorporate the locator 210, and be communicatively coupled to one or more of the remote devices 40 via the communication interface 53.

The locator 210 may include a core function or locator algorithm 212 that is configured to receive the one or more inputs 216 and to generate the one or more outputs 218 indicative of a location of the smartphone 20 relative to the object 10. As discussed herein, the one or more inputs 216 may vary from application to application. Examples of inputs 216 include one or more signal characteristics of the communications, such as signal strength (RSSI), angle of arrival (AOA), time of flight (TOF), IQ, phase, phase-based distance, time of arrival, impulse response, HADM based ranging, angle of departure (AOD), round-trip-timing, a quality metric, a first path (or other) power characteristic (e.g., with respect to UWB communications), and a link quality characteristic.

The locator 210 is described herein in conjunction with one or more inputs 216. The one or more inputs 216 may include one or more outputs 218 from another locator 210. For example, a first locator 210 may be influenced by a second locator 210 via one or more inputs 216 received from the second locator 210. As described herein, the first locator 210 may dynamically adjust based on operation of the second locator 210. The first locator 210 may receive one or more inputs 216 from the second locator 210 and may dynamically adjust based on operation of the second locator 210. For instance, the first locator 210 may offset a value of a given signal characteristic via calibration data (e.g., adjust RSSI by +4 or −4) based on operation of the second locator 210, or may receive inputs 216 from the second locator 210, or both.

In one embodiment, first and second locators 210 may be utilized to generate one or more outputs 218 respectively from each of the first and second locator 210. The one or more outputs 218 from each of the first and second locators 210 may be aggregated or combined (e.g. via a function or heuristic) to yield a location. In this way, the first and second locators 210 may be utilized in parallel to enhance locator performance.

The first locator and the second locator 210 may be based on the same or different types inputs 216. For example, the second locator 210 may utilize inputs based on one or more of RSSI, AOA, phase-based distance, TOF, and BLE channel sounding (e.g., high accuracy distance measurement [HADM]). And, the first locator 210 may utilize inputs based on UWB. Alternatively, the first locator 210 may utilize inputs based on RSSI, and the second locator 210 may utilize inputs based on UWB and/or HADM. The system 100 may calibrate a UWB-based locator based on communications according to BLE CS/HADM, or the system may calibrate a BLE CS/HADM-based locator based on communications according to UWB.

In one embodiment, BLE CS/HADM may be based on one or more of phase-based ranging, round-trip timing (TOF), and related security aspects. It is noted that channel sounding (CS) may be described in conjunction with HADM, which is the precursor naming convention for CS in the BLE realm. Channel sounding or CS, also described as HADM, may be based on a tone exchange between an initiator device, device A, and a reflector device, device B. The tone exchange may involve device A transmitting an initiator signal according to a frequency, device B receiving the initiator signal, device B transmitting a reflector signal based on the initiator signal according to the same frequency, and device A receiving the reflector signal. Based on a phase characteristic of the initiator signal and/or the reflector signal measured respectively by the device B or device A, a phase rotation of the initiator signal and/or the reflector signal may be determined, enabling a distance determination with respect to device A and B.

Figure 5:
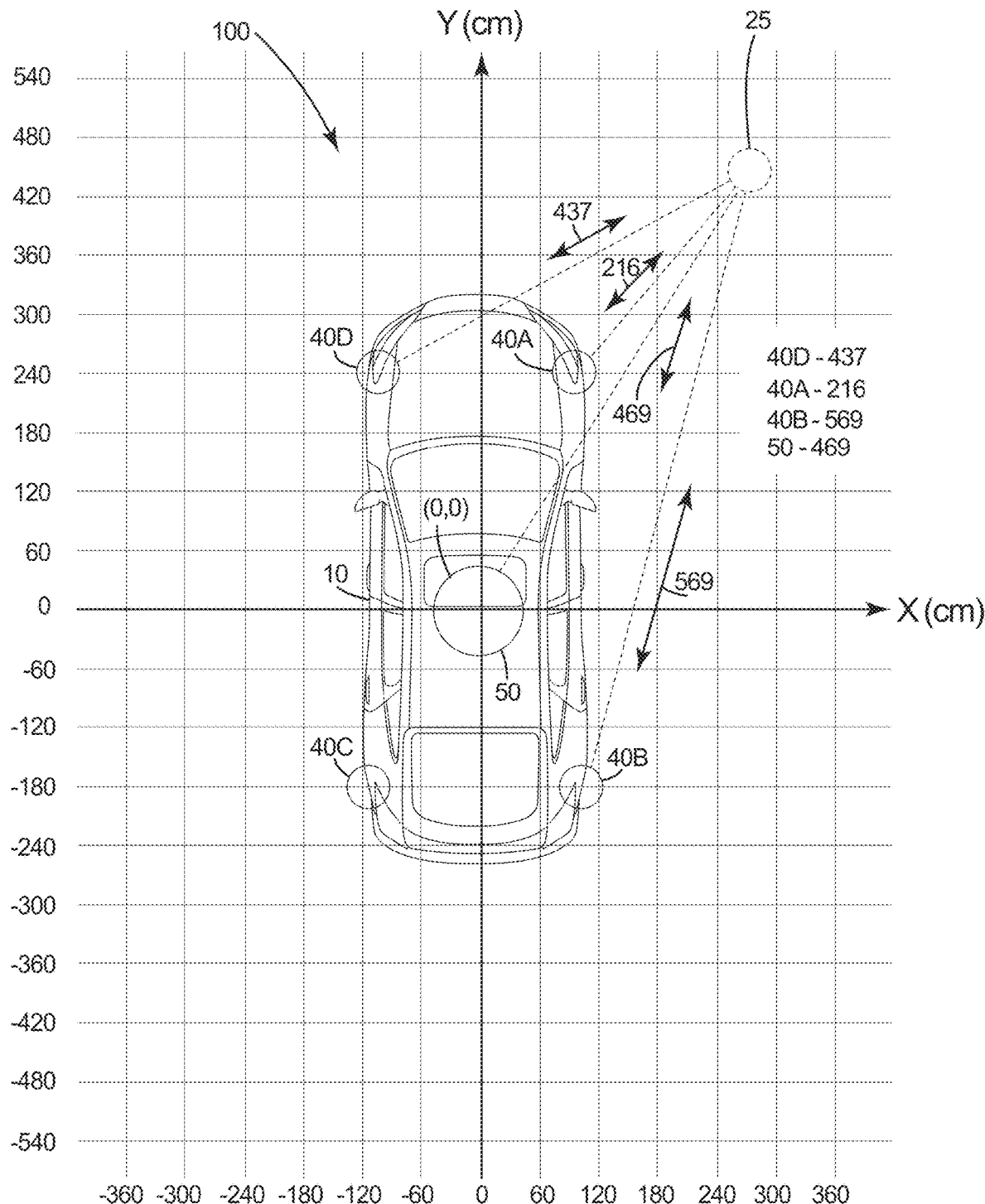
FIG. 5 shows a representative view of an object in accordance with one embodiment.

In the illustrated embodiment of FIG. 5, the system 100 is provided in conjunction with an object 10 that is a vehicle. The object 10 may be different in other applications. The system 100 in the illustrated embodiment includes an object device 50 and a plurality of remote devices 40A-D disposed in a fixed position on the object 10, such that these devices comprise fixed position devices. The locations of the remote devices 40A-D and the object device 50 may vary from application to application; however, for purposes of disclosure the object device 50 is disposed generally in a center of the vehicle cabin and the remote devices 40A-D are disposed at the four corners of the vehicle. A grid is shown in the illustrated embodiment to facilitate discussion in conjunction with the locator 210.

In the illustrated embodiment of FIG. 5, the smartphone 25 is disposed at X, Y coordinates 270 cm, 450 cm relative to the origin (0 cm, 0 cm) provided at the center of the object 10. The remote devices 40A, 40B, 40D are respectively positioned at 258 cm, 648 cm, and 442 cm relative to the smartphone 25. In one embodiment, a signal characteristic of communications (e.g., RSSI) transmitted from the keyfob 25 and received by each of the remote devices 40A, 40B, 40D and the object device 50 may be translated by the locator 210 to a distance or location relative to each respective remote device 40A, 40B, 40D. (Remote device 40C is shown and left out of this determination in the illustrated embodiment because a portion of the vehicle obstructs the line of sight between the smartphone 25 and the remote device 40C, potentially preventing a valid measurement of a signal characteristic of communications.)

The keyfob 25 is disposed at X, Y coordinates 280 cm, 460 cm relative to the origin (0 cm, 0 cm). The remote devices 40A, 40B, 40D are respectively positioned at 216 cm, 569 cm, and 437 cm relative to the keyfob 25. A signal characteristic of communications transmitted from the keyfob 25 and received by each of the remote devices 40A, 40B, 40D and the object device 50 may be translated by the locator 210 to a distance or location of the keyfob 25 relative to the object 10. In one embodiment, based on a distance determination with respect to each of the remote devices 40A, 40B, 40D and the object device 50, and known locations of the remote devices 40A, 40B, 40D and the object device 50, the locator 210 may determine a location of the keyfob 25 relative to the object 10.

The locator 210 in one embodiment may translate the signal characteristic obtained from a remote device 40 or the object device 50 to a distance metric or other parameter in a variety of ways, including, for instance, a translation table for each fixed position device or type of fixed position devices, fingerprinting or other heuristic (e.g., a machine learned translator). An example of a translation table is shown in chart form in the illustrated embodiment of FIG. 6 and generally designated 600. The locator 210 in one embodiment may determine a location based on a machine learning algorithm, which may be trained based on truth information obtained during a training and validation process.

Figure 6:
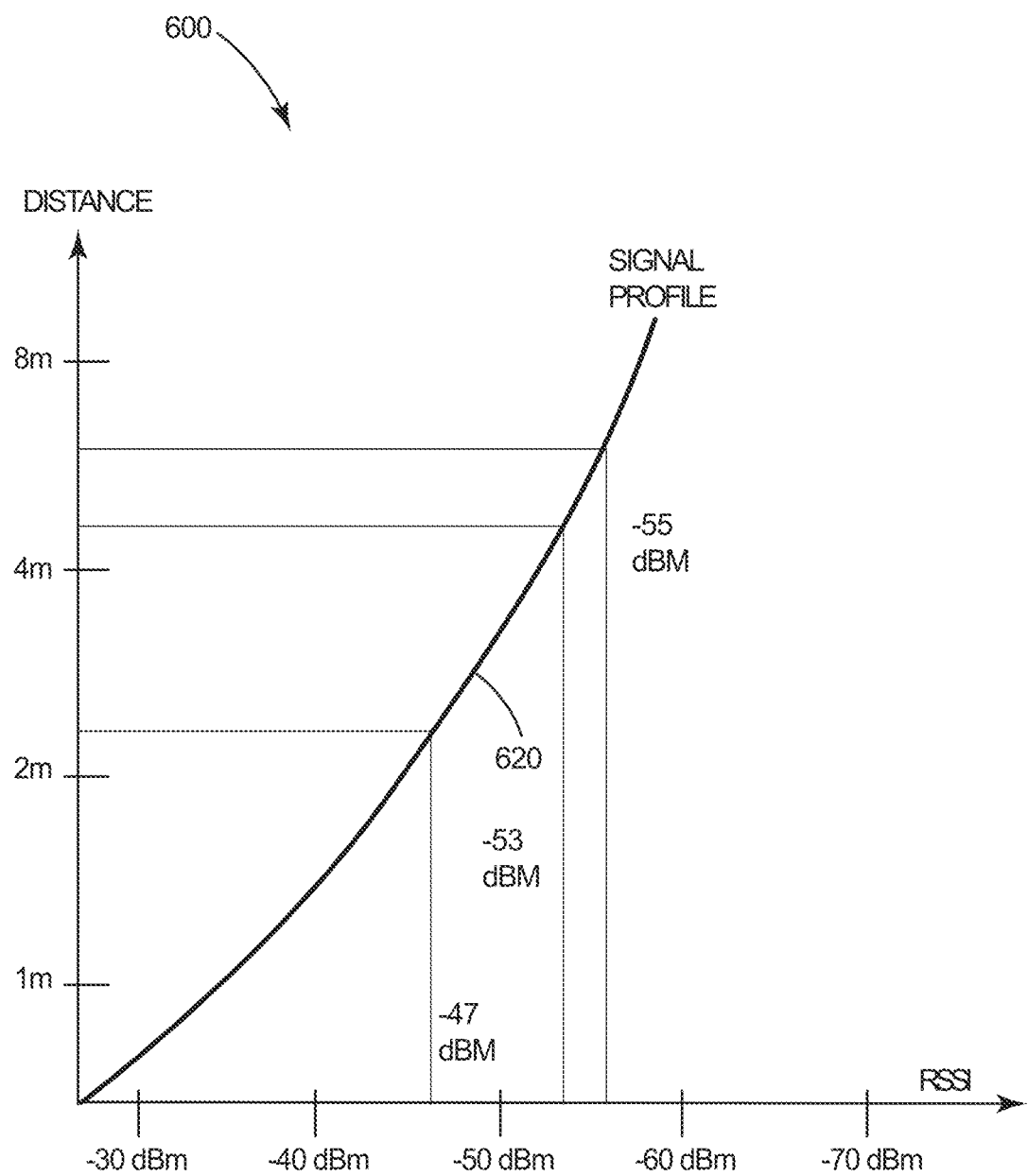
FIG. 6 shows a signal characteristic in accordance with one embodiment.

In the illustrated embodiment of FIG. 6, the translation table 620 is operable to translate RSSI to a distance for each of the remote devices 40A, 40B, 40D. Returning to the illustrated embodiment of FIG. 5, measurements of RSSI for the remote devices 40A, 40B, 40D correspond generally and respectively to −47 dBm, −53 dBm, and −55 dBm. These RSSI measurements for each remote device 40A, 40B, 40D may be translated directly to distance measurements based on the translation table 620; alternatively, the locator 210 may utilize the RSSI measurement to represent distance in further calculations to determine the position of the smartphone 20 relative to the object 10.

In the illustrated embodiment, with the three distances determined relative to each of the remote devices 40A, 40B, 40D based on the translation table 620, the locator 210 may determine a location of the keyfob 25 by trilateration of the three distances given known positions of the remote devices 40A, 40B, 40D. It should be noted that the present disclosure is not limited to trilateration as part of the locator algorithm 212; a variety of additional or alternative functions may form part of the locator algorithm 212, as discussed herein, including a distance function, a triangulation function, a lateration function, a multi-lateration function, a fingerprinting function, a differential function, a time of flight function, a time of arrival function, a time difference of arrival function, an angle of departure function, a geometric function, etc., or any combination thereof.

The locator algorithm 212 of the locator 210 may be tunable according to a plurality of parameters 214 of the locator 210. Example parameters include the following: sensor offsets (e.g., RSSI or AOA offsets, or both), zone offsets (e.g., thresholds and hysteresis parameters), and distance conversion (e.g., constants or equations, or both). Based on the one or more inputs 216 and the values of the plurality of parameters 214, the locator function 212 may provide an output 218 indicative of a location of the keyfob 25 relative to the object 10. The locator algorithm 212 may vary from application to application. In one embodiment, presence and locations of the keyfob 25 and the smartphone 20 may be determined as a basis for authorizing one or more object commands. Examples of such a configuration are described in U.S. patent application Ser. No. 16/713,358, entitled A SYSTEM AND METHOD OF DETERMINING REAL-TIME LOCATION, filed Dec. 13, 2019, to Smith et al.—the disclosure of which is hereby incorporated by reference in its entirety.

IV. Method of Authorizing an Object State

Figure 7:
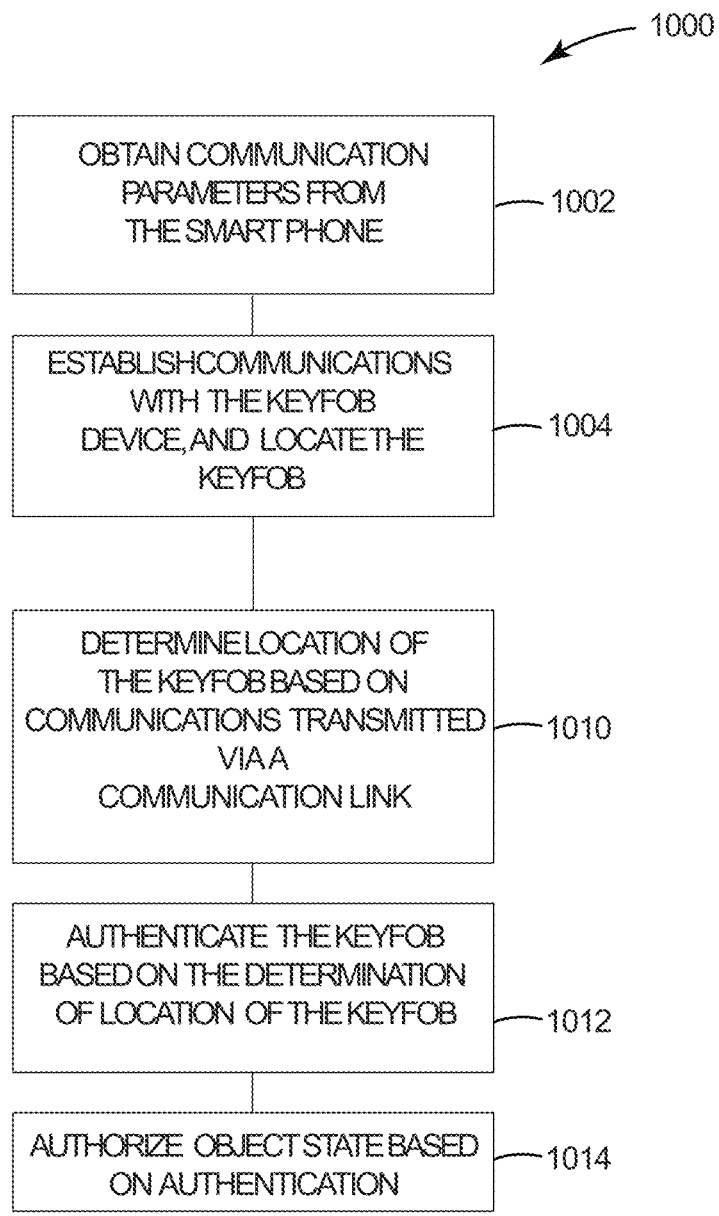
FIG. 7 shows a method in accordance with one embodiment.

A method of authorizing an object state of the object 10 is provided in the illustrated embodiment of FIG. 7 and generally designated 1000. Authorization of the object state (e.g., enabling an object function) may be based on communications received by the object 10 from the smartphone 20 and/or the keyfob 25. In one embodiment, the keyfob 25 may not be configured to communicate with the object 10 for authorizing the object state prior to receipt of one or more communication parameters from the smartphone 20.

The object state may correspond to a command or action with respect to the object 10. It should be noted that authorization for an object state may not include transitioning to the object state; rather, authorization may involve the object 10 determining to allow a transition to the object state. In one embodiment, the object 10 may be configured to transition to the object state in response to authorizing the object state. Alternatively, the object 10 may be configured to transition to the object state in response to one or more criteria being satisfied. As an example, the object 10 may transition to the object state in response to receipt of a command from the keyfob 25 to transition to the object state. In a more specific version of this example, in the realm of vehicles, a command to unlock a door or to start the vehicle may be authorized prior to receipt of the command based on communications received from the keyfob 25, and then carried out in response to receipt of the command. Nothing may need to be done from the user's perspective for this to occur. For instance, the vehicle may open the door automatically if the keyfob is in proximity to the door 14 without requiring the user to push a button on the keyfob 25.

Authorization for the object state may be based on communications received from the keyfob 25. In one embodiment, one or more signal characteristics may be determined in at least one of the object device 50 and one or more remote devices 40 with respect to received communications from the keyfob 25. The one or more signal characteristics may be provided to the locator 210, which may determine a location of the keyfob 25.

In the illustrated embodiment, the smartphone 20 may be configured to communicate with the keyfob 25 before the keyfob 25 is configured to be authorized with respect to one or more object commands or states of the object 10. For instance, the keyfob 25 may be paired via BTLE to communicate with the smartphone 20 to obtain one or more communication parameters for authorization with respect to the keyfob 25 and the object 10. The keyfob 25 may not be configured to communicate with the object 10 for purposes of authorizing the object state prior to receipt of one or more communication parameters from the smartphone 20.

Based on the communication parameters obtained from the smartphone 20, the keyfob 25 may be configured to communicate with the object device 50 of the object 10. In the illustrated embodiment of FIG. 1, the keyfob 25 may establish a wireless connection with the object 10 via the communication link 160. The wireless connection in the illustrated embodiment is a BTLE connection, but it should be understood that the present disclosure is not so limited. Another type of wireless connection may be established.

In establishing the communication link 160 using BTLE with the object device 50, the keyfob 25 may initially operate as a central device with the object device 50 operating as a peripheral device. As the keyfob 25 moves into proximity to the object device 50 or within range of BTLE communications with the object device 50, the keyfob 25 may receive advertisements from the object device 50 operating as a peripheral device and establish a first wireless connection with the object device 50. At this stage, the object device 50 and the keyfob 25 may negotiate to switch roles with the object device 50 becoming the central device and the keyfob 25 becoming the peripheral device. The object device 50 may communicate one or more connection parameters to the keyfob 25 to facilitate establishing a second wireless connection, for which the keyfob 25 is the peripheral device and the object device 50 is the central device.

In one embodiment, the object device 50 may provide the one or more communication parameters to one or more of the remote devices 40 via an auxiliary communication link 130, which may be wired or wireless, or a combination thereof. For instance, the auxiliary communication link 130 may be similar to the communication links 140, 160 but facilitate communication using a different wireless connection. For instance, the auxiliary communication link 130 may occur via a CAN-FD communication link, a LIN communication link, or a wireless BTLE communication link, or a combination thereof. As another example, the communication link 160 and the auxiliary communication link 130 may be based on BTLE but utilize different wireless connections. After the one or more remote devices 40 receive the one or more communication parameters utilized for the wireless connection between the keyfob 25 and the object device 50, the one or more remote devices 40 may monitor communications transmitted from the keyfob 25 and generate one or more signal characteristics with respect to these communications. As an example, the one or more remote devices 40 may utilize the communication parameters as a basis for sniffing communications between the keyfob 25 and the object device 50 without actively being involved in such communications. The one or more remote devices 40 may generate one or more sensed characteristics based on the sniffed communications, and communicate sensed information indicative of the sensed characteristics via the auxiliary communication link 130.

In one embodiment, the user 60 may be carrying the keyfob 25, which the user 60 may have configured to communicate with the object 10 based on information obtained from the smartphone 20. Step 1002. The keyfob 25 may be configured to communicate over multiple communication channels (e.g., difference frequencies) in accordance with the one or more connection parameters received from the smartphone 20, in a manner different from the standard connection mode.

Information pertaining to the one or more signal characteristics, such as the values obtained for the one or more signal characteristics, may be transmitted via the auxiliary communication link 130 to the object device 50, which may provide the information to the locator 210 to determine a location of the keyfob 25 relative to the object 10. Step 1004.

In the illustrated embodiment, the object device 50 may share the one or more connection parameters with at least one of the remote devices 40 to facilitate monitoring communications emanating from the keyfob 25 at more than one location. Based on the communications monitored in at least one of the object device 50 and one or more remote devices 40, one or more sensed characteristics may be generated and utilized by the locator 210 to determine at least one of presence and a location of the keyfob 25. Detection of presence or location, or both, may be conducted based on communications transmitted from the keyfob 25 in a manner similar to the location detection with respect to communications transmitted from the smartphone 20.

In one embodiment, based on communications transmitted from the keyfob 25, the object device 50 of the object 10 may determine a location of the keyfob 25. Step 1010. This may be conducted in a manner similar to that described in conjunction with determining a location of the smartphone 20 based on communications transmitted from the smartphone 20. For instance, one or more signal characteristics may be determined with respect to communications transmitted from the keyfob 25, and these one or more signal characteristics may be provided to a locator 210 (possibly the same locator 210 used for determining location of the smartphone 20, a different locator, or an adapted version of the locator 210) to determine the location of the keyfob 25. For instance, the location of the keyfob 25 may be based on a plurality of signal strength measurements with respect to transmissions from the keyfob 25 and a translation table as described in conjunction with the illustrated embodiment of FIG. 6.

Based on a determined location of the keyfob 25, the object device 50 may be configured to authenticate and authorize or not authorize the object state. Steps 1012, 1014. For instance, if the keyfob 25 is determined to be within a zone of the object 10, an object state associated with that zone may be authorized. Zones may be pre-determined static zones or dynamic zones. In the context of a vehicle, examples of pre-determined zones include a region proximate the driver-side door that is exterior to the vehicle cabin and within 3 feet of the driver-side door, a driver-side seat region, a front passenger-side seat region, a left or rear passenger seat region, a trunk region proximate to a trunk lid or door that is exterior to the trunk space and within 3 feet of the trunk lid or door. Dynamic zones may be based on state changes with respect to the object 10, such as whether one or more doors are open or closed, or one or more windows are opened.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A portable device operable to communicate with an object, said portable device comprising:
    an antenna system configured to communicate wirelessly with the object, wherein said portable device and the object are configurable to communicate wirelessly via a primary communication link;
    a controller operably coupled to said antenna system, said controller configured to receive one or more parameters from a remote device via a secondary communication link with the remote device, wherein the one or more parameters pertain to authentication with respect to the object; and
    said controller configured to direct the antenna system to transmit communications to the object via said primary communication link, said controller operable to authenticate with respect to the object based on the one or more parameters received from the remote device via the secondary link, whereby the object is operable to determine a location of said portable device based on said communications from said portable device.

2. The portable device of claim 1 wherein a display is absent from the portable device, and wherein the remote device is a smartphone.

3. The portable device of claim 1 wherein said one or more parameters pertain to authorization with respect to one or more capabilities of the object.

4. The portable device of claim 1 wherein said controller is configured to communicate wirelessly with a plurality of devices disposed on the object.

5. The portable device of claim 4 wherein the plurality of devices includes an object device and at least one sensor disposed on the object, wherein the controller is configured to establish the primary communication link with at least one of the plurality of devices.

6. The portable device of claim 5 wherein one or more signal characteristics are determined with respect to the communications of the primary communication link.

7. The portable device of claim 6 wherein the one or more signal characteristics include at least one of a signal strength, angle of arrival, a time-of-flight, IQ, phase, a phase-based characteristic, time of arrival, impulse response, angle of departure, round trip timing, a quality metric, a first path power characteristic, a link quality characteristic, and an output from a multilateration determination.

8. The portable device of claim 1 wherein the portable device communicates with the object via an ultra-wideband communication link, and wherein the remote device communicates with the object via a Bluetooth Low Energy communication link.

9. The portable device of claim 1 wherein said parameters pertain to communicating with the object and enabling one or more devices disposed on the object to at least one of monitor communications from said antenna system to the object and communicate directly with said antenna system of the object.

10. The portable device of claim 1 wherein at least one of an object status and an object event is authorized based on a determined location of the portable device.

11. The portable device of claim 1 wherein the antenna system includes a Bluetooth Low Energy antenna constructed to communicate wirelessly with the object and the remote device.

12. A system including said portable device of claim 1 in combination with said remote device, said remote device comprising:
    a remote device antenna system configured to communicate wirelessly with the object via a remote device primary communication link, said remote device antenna system configured to communicate wirelessly with said portable device separate from said remote device primary communication link;
    a memory to store one or more parameters pertaining to the object; and
    a remote device controller operably coupled to said remote device antenna system, said remote device controller configured to transmit one or more parameters to said portable device, wherein at least one of an object status and an object event is authorized based on the one or more parameters provided to said portable device.

13. The system of claim 12 wherein said portable device is operable to communicate wirelessly with the object based on the one or more parameters.

14. The system of claim 13 wherein at least one of said remote device and said portable device is operable to establish a direct communication link with at least one sensor of the object, wherein said remote device is a smartphone.

15. The system of claim 14 wherein the direct communication link between said portable device and the at least one sensor of the object is an ultra-wideband communication link or a Bluetooth communication link.

16. A method of facilitating operation of an object, said method comprising:
    communicating wirelessly with the object via a primary communication link between the object and a remote device,
    communicating wirelessly with a portable device separate from the remote device;
    storing one or more parameters pertaining to the object;
    transmitting one or more parameters from the remote device to the portable device, wherein the one or more parameters pertain to authentication with respect to the object;
    determining a location of the portable device with respect to the object;
    authenticating the portable device with respect to the object based on the one or more parameters received from the remote device; and
    authorizing at least one of an object status and an object event based on the one or more parameters provided to the portable device.

17. The method of claim 16 comprising communicating wirelessly with the object via a secondary communication link between the object and the portable device.

18. The method of claim 17 wherein the secondary communication link is a direct communication link with at least one sensor of the object.

19. The method of claim 18 wherein the direct communication link between the portable device and the at least one sensor of the object is an ultra-wideband communication link or a Bluetooth communication link.

20. The method of claim 16 wherein the one or more parameters pertain to authorization with respect to one or more capabilities of the object, and wherein the remote device is a smartphone.

* * * * *